DELAY LINE MAP OUTLINE where A = Field identifier for availability

Fig. 6

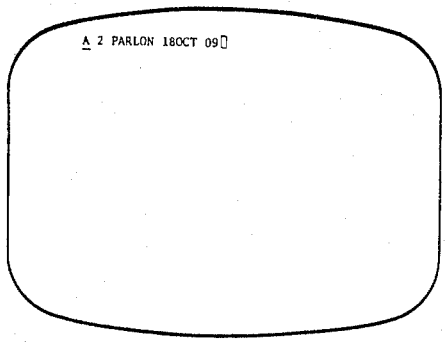

where  A    =  Field identifier for availability
       2    =  Number of Seats
       PAR  =  Point of departure
       LON  =  Destination
       09   =  Customer preferred departure time
       ▯    =  Entry marker

Fig. 7

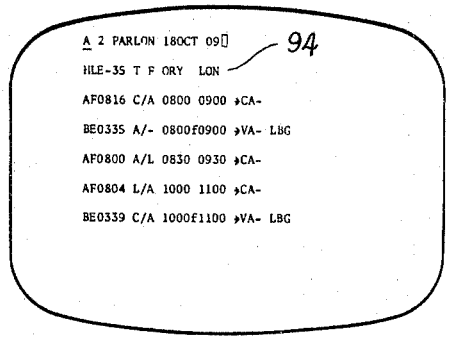

| Where | HLE | = | Check-in time required in minutes |
| (second line) | T | = | Column heading for status of tourist class flights |
| | F | = | Column heading for status of first class flights |
| | ORY | = | Airport of departure – column heading for departure times |
| | LON | = | Destination – column heading for arrival times |
| (last line, as example) | BE0339 | = | Airline and flight number |
| | C/A | = | Flight status conditions |
| | 1000 | = | Time of departure |
| | f | = | Aircraft leaving from airport other than ORY (or other special conditions) |
| | 1100 | = | Time of arrival |
| | → | = | Non-stop flight (or number of stops) |
| | VA | = | Type of aircraft |
| | LBG | = | Airport of departure |

Fig 8

```
A 2 PARLON 18OCT 09 SAF0804F2[]
HLE-35 T F ORY LON ————— 94
AF0816 C/A 0800 0900 →CA-
BE0335 A/- 0800f0900 →VA- LBG
AF0800 A/L 0830 0930 →CA-
AF0804 L/A 1000 1100 →CA-
BE0339 C/A 1000f1100 →VA- LBG
```

The agent depresses the TRANS key which causes SAF0804F2[] to be transmitted to the data processor.

Fig 9

```
AF0804F18OCT ORY1000LON1100 →CAB 35 SS2[]
``` where  CAB = Type of aircraft and meals (Breakfast)
       35  = Check-in time required in minutes
       SS  = Processor code for "Sold"
       2   = Number of seats

Fig 10

```
AF0804F18OCT ORY1000LON1100 →CAB 35 SS2
AF0919F18OCT LON1900ORY1955 →CAD 35 SS2[]
```

Fig 11

```
AF0804F18OCT ORY1000LON1100 →CAB 35 SS2
AF0919F18OCT LON1900ORY1955 →CAD 35 SS2
N1JONES N1DUCHEMIN
PH2039662981 PB2033484291 RSPM
T O 1800/17OCT B COOK/328 *[]
``` where  N          = Field identifier for name and number of passengers so named per passenger record (if necessary, initials or Mr., Mrs.)
       PH         = Home telephone or contacts
       PB         = Business telephone
       R          = Field identifier for remarks
       SPM        = Additional information (special meal)
       T          = Field identifier for ticket
       O 1800/17OCT = Ticket status and time limit
       B          = Field identifier for booked by (if the passenger made the reservation himself, the agent enters PSG)
       COOK/328   = Travel agency and travel agent number or party name and title
       *          = End of record

United States Patent Office 3,484,748
Patented Dec. 16, 1969

---

3,484,748
ON-LINE DATA PROCESSING APPARATUS
Carl Greenblum and Robert J. Buegler, Stamford, and Joseph F. McCarroll, South Norwalk, Conn., Emik A. Avakian, Tuckahoe, N.Y., and John Granbery, Stamford, Conn., assignors to The Bunker-Ramo Corporation, Stamford, Conn.
Filed Oct. 5, 1964, Ser. No. 401,306
Int. Cl. H04q 1/00, 3/00
U.S. Cl. 340—153                               13 Claims

ABSTRACT OF THE DISCLOSURE

An on-line data processing system utilizing a central computer and having data composer terminal apparatus including a CRT display to facilitate communication between the terminal apparatus and the central computer.

---

This invention relates to on-line data processing systems. More particularly, this invention relates to apparatus and methods for determining the reservation status of public accommodations, such as the availability of aircraft seats, and for effecting the sale of selected accommodations.

High speed data processing apparatus has been used for some time now for making reservations in various commercial fields such as airlines, hotels, trains, etc. Examples of such equipment used for making airline reservations are described in U.S. Patents 2,594,960 and 3,134,016. The present invention similarly is illustrated herein by a specific embodiment designed for use in making airline reservations.

Typically, an airline reservation system comprises a centrally-located computer connected to a large number of remote agent stations, e.g. in major cities of the country or area served. The central computer includes a rapidly-accessible data storage device, such as a rotating magnetic drum, on which is recorded signals representing the current reservation status of all airline flights (i.e. how many seats are left in various categories) for a future period such as three months, six months or a year. Each of the remote agent stations includes manually-operable means for interrogating the central computer to determine the availability of reservations on selected flights, and for effecting a change in the recorded reservation status at the central data storage when a sale of space has been made.

Since virtually the time when computer-controlled airline reservation systems first went into widespread commercial operation, the remote agent stations forming part of the systems almost universally have been of the type comprising a keyset utilizing a group of coded plate selectors one of which is inserted into the keyset by the reservation agent to control the electrical interrogating signal sent to the central computer. As described in more detail in U.S. Patent 2,564,410, each coded plate carries on its face printed descriptive material relating to a number of flights, e.g. 8 or 10 alternative flights, or legs of a continuing flight, about which availability queries may be made. The coded plate also is formed along at least one edge with notches the permutational arrangement of which is unique to the respective plate.

Each such agent station has in the past been provided with a large number of these coded plates covering all of the available flights in various groupings, that is, a particular flight or flight leg may appear on a number of plates. The usual procedure is that the customer tells the agent his destination and the desired flight time, and the agent picks a coded plate covering a group of flights several or all of which might meet the customer's requirements. The agent inserts this plate into a receptacle in the keyset, and the notches on the edge of the plate operate switches to set up electrical signalling circuitry in a manner uniquely corresponding to the selected plate. The agent then actuates keys on the keyset to insert additional information, such as the date of the desired flight, the number of seats, etc., and the signalling circuitry is further controlled in accordance with these settings. When those operations have been completed, the agent presses a start button and the keyset sends the interrogating signal to the central computer requesting information on all of the flights identified by the selected code plate.

The central computer searches for the appropriate inventory data, conducts the necessary arithmetic operations, and sends an answer-back signal to the interrogating keyset. This answer-back signal controls a series of indicator lights mounted alongside the selected code plate and corresponding to the several flights covered thereby. For example, each light may be positioned alongside a corresponding column (or row) of the printed material giving the data on a respective flight. If the light is turned on by the answer-back signal, this will (for example) mean that the flight identified in that column (or row) has sufficient space remaining for the required reservation. Alternatively, if the light is not turned on, this will mean that the particular flight does not have sufficient space. Thus, some or all of the lights may be energized to indicate that some or all of the flights identified on the code plate have sufficient space to meet the customer's requirements.

This agent station concept has been used for essentially all airline reservation systems throughout the United States and many other countries of the world. Although there have been changes in design of the keysets from time to time, apparently without exception the prior systems have utilized some form of coded plate or other carrier of written material describing a group of flights, in combination with controllable lights or the like adjacent thereto to indicate the current reservation status of the individual flights making up the group identified by the coded plate.

This agent station concept has, then, been highly successful. Nevertheless, there have been several problems encountered in its use. For example, it has been relatively expensive to maintain up-to-date flight information on the plates in the face of rapid schedule changes by the carriers in their efforts to accommodate altered market conditions and to meet competition. Any such schedule change (or service change, in some cases) requires a corresponding change in all of the coded plates which carry that flight. Since some airlines have several thousand agent "positions," and since some flights appear on more than one coded plate, it will be evident that the effects of a change in flight operations may require considerable effort in updating all affected plates. Although various proposals have been made from time to time in an effort to overcome this problem, these proposals have not provided a satisfactory solution.

Accordingly, it is an object of this invention to provide an improved data processing system for aiding in determining the reservation status of a group of items. Another object of this invention is to provide such a system which eliminates the cost of updating the coded selector plates used in previous reservation systems. Still a further object of this invention is to provide a reservation system which is sufficiently flexible to meet various requirements, and yet is relatively economical to construct and maintain. Other objects, aspect and advantages of this invention will in part be pointed out in, and in part apparent from, the following description considered together with the accompanying drawings, in which:

FIGURES 5 through 11 show the cathode ray tube display at successive stages of a reservation operation.

Figure 1:
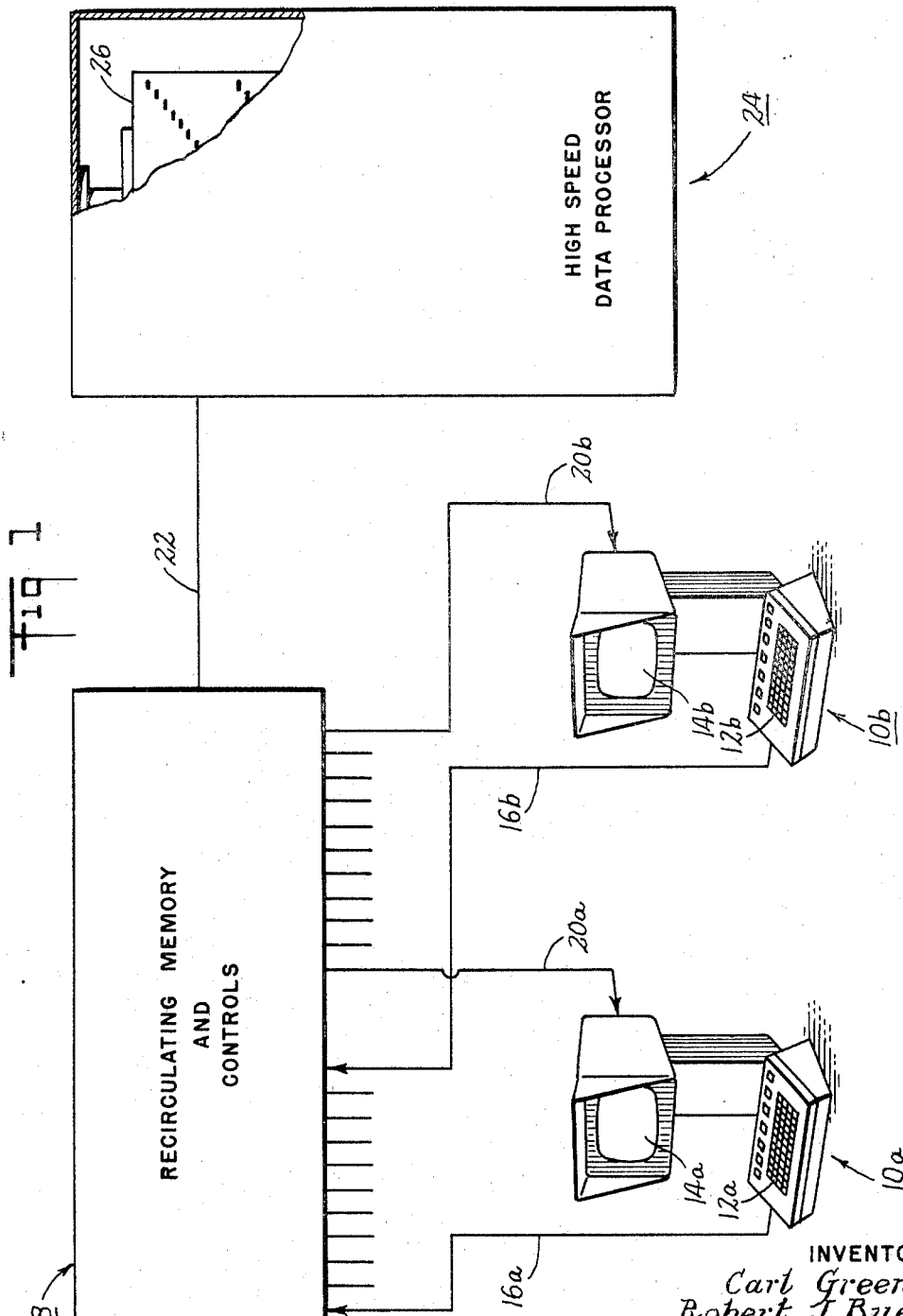
FIGURE 1 is a simplified diagram showing the basic elements of a system in accordance with this invention.

Referring first to FIGURE 1, the system comprises a number of agent stations 10 (identified individually with different alphabetic suffixes) each including a manually-operable keyboard 12 and a cathode-ray-tube display device 14. Depression of any key of a keyboard 12 transmits a corresponding permuted electrical signal over a line 16 to a recirculating memory and control apparatus 18 where the signal is temporarily stored. Control apparatus 18 also sends a periodically recurring signal over a line 20 to activate the associated CRT 14 to cause it to display an alphanumeric character corresponding to the key depressed. As subsequent keys are depressed, a complete message can be assembled in a line of the CRT display. CRT apparatus of this general type, together with ancillary equipment suitable for forming alphanumeric characters, is disclosed in copending application Ser. No. 370,323, filed May 26, 1964 by R. D. Belcher et al.

The memory and control apparatus 18 is connected by a two-way transmission circuit 22 to a high-speed data processor 24. This processor includes rapidly-accessible data storage means, illustrated herein as a rotating magnetic drum 26, on which is recorded numerical information respecting the current inventory status of a large number of scheduled aircraft flights, e.g. for a period of three months in advance. This information typically will be recorded in the form of binary signals indicating, for each flight, the number of unsold seats remaining.

Figure 2:
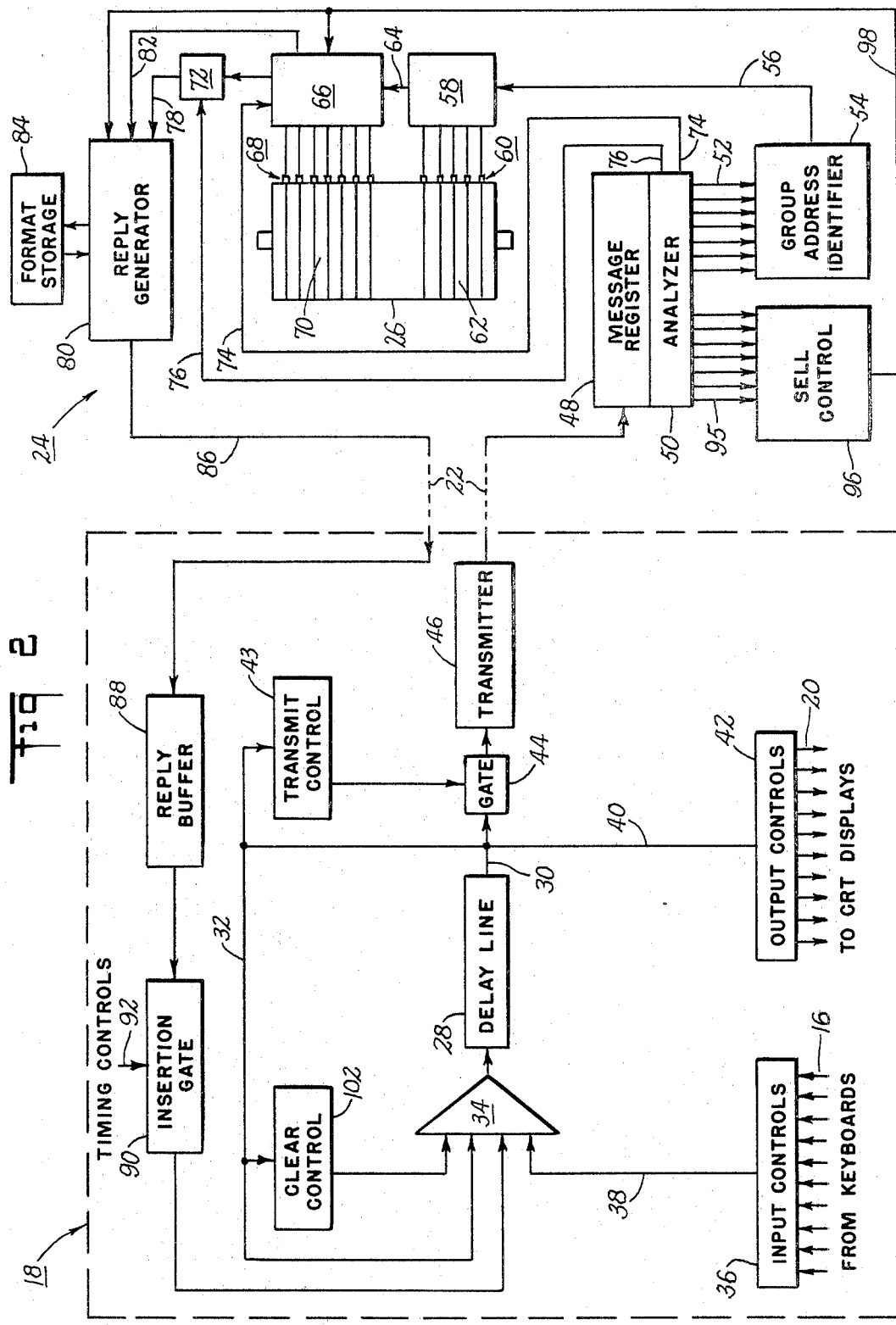
FIGURE 2 is a block diagram giving further details of the system.

Referring now also to FIGURE 2, the memory apparatus 18 illustrated herein includes a magnetostrictive sonic delay line 28 for storing, in binary form, the signals generated by the keyboards 12. Details of a similar delay line arrangement are disclosed in copending application Ser. No. 307,190, filed Sept. 6, 1963, by Windels et al., and also in the above-mentioned application Ser. No. 370,323. This delay line is arranged as a recirculating memory by connecting its output 30 through a feedback line 32 to the input gate 34.

The several lines 16 from the keyboards 12 are periodically sample on a time-sharing basis by a multiplexing arrangement of conventional construction, and referred to herein as the input controls 36. For further information on such equipment, reference should be made to the above-identified copending applications and to U.S. Patent 3,133,268 issued on May 12, 1964, to E. A. Avakian et al. In brief, whenever a signal appears on one of the lines 16 in response to depression of one of the keys, this signal is detected essentially immediately and is temporarily stored in the controls 36. Thereafter, at an appropriate time in the cycling of the delay line 28, a corresponding signal is directed by lead 38 to input gate 34 and inserted in the delay line.

Figure 4:
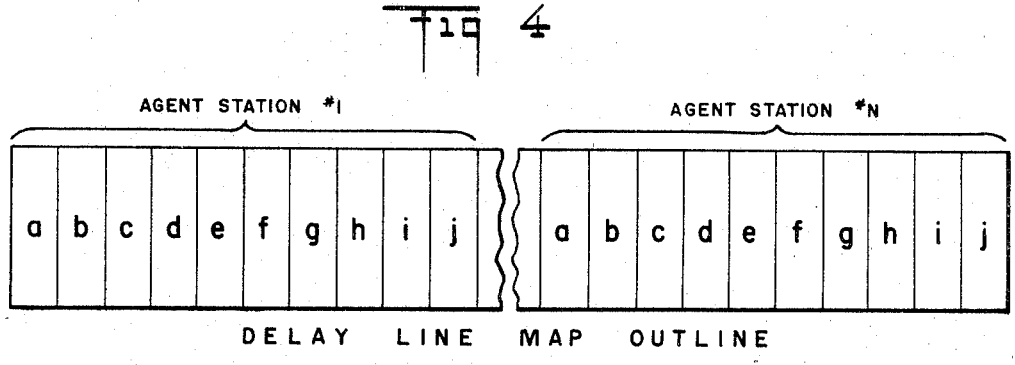
FIGURE 4 is a diagrammatic illustration of the delay line data storage arrangement.

As illustrated in FIGURE 4, the storage capacity of the delay line is subdivided serially into a number of "time" blocks each assigned to a corresponding agent station. These time blocks are in turn subdivided into a series of segments, $a$, $b$, $c$, etc., and the system is so arranged that the signals stored in each segment control a corresponding line of the associated CRT display. The signals sampled from the keyboard are inserted in the delay line at the proper times to place them in the assigned blocks of the delay line, and in the correct segment thereof to provide the desired positioning of the message on the face of the CRT.

The signals recorded in the delay line also are fed through a lead 40 to the output controls 42. This latter circuit includes conventional character generating and multiplexing means arranged to distribute to each CRT unit signals based on those stored in the corresponding block of the delay line and adapted to create on the face of each CRT respective alphanumeric figures.

Figure 3:
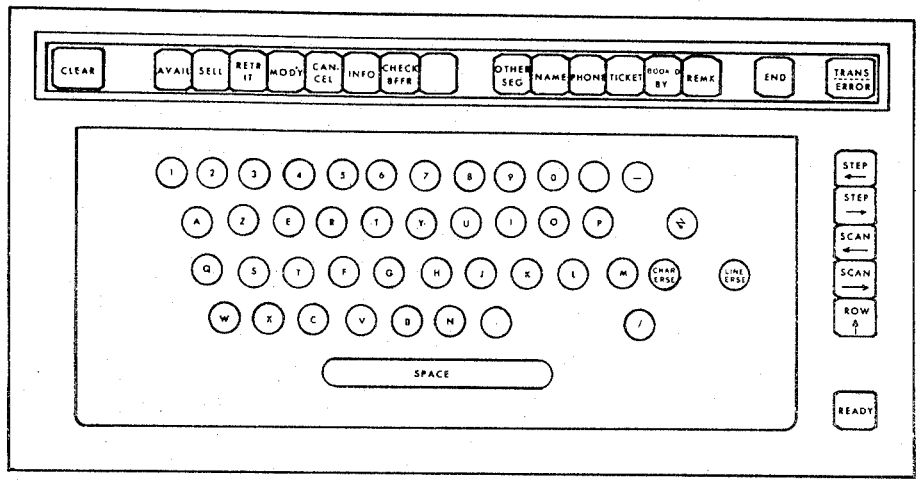
FIGURE 3 is a layout of the keyboard used at the agent station.
Figure 5:
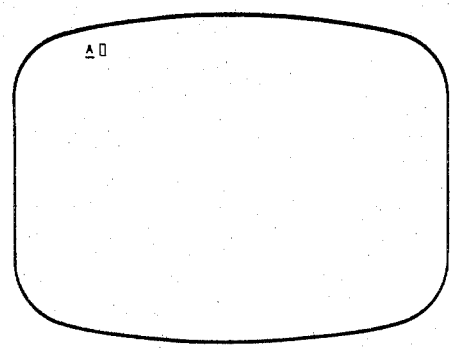

To make an "availability call", the reservation agent will first press the AVAIL key (see FIGURE 3) of his keyboard to indicate that the forthcoming query will be for an availability check. Pressing this key will place the letter A on the first line in the upper left-hand corner of the screen, as shown in FIGURE 5. (The rectangular figure following A is a marker which is automatically generated to indicate where the next character entered will appear on the face of the CRT.) Thereafter, the agent will enter a query message giving the customer's specifications for the desired flight. An illustrative example of such a message is shown in FIGURE 6.

After the query message has been entered and checked for accuracy, the agent presses the TRANS key. This enters in the delay line a special code which is detected by a transmit control 43. The latter activates a gate 44 to direct the stored query message to a transmitter 46. This transmitter sends a corresponding electrical signal through the circuit 22 to the central data processor 24 where the query is stored in a message register 48.

The stored query is examined by a conventional binary analyzer circuit 50 which is illustratively shown as having a plurality of output leads 52 which are selectively energized in accordance with the particular coding of the stored query. For example, if the query is for flights between Paris and London (as indicated in FIGURE 6) a particular one of the leads 52 might be energized, whereas if the query is for flights between London and Paris, a different lead might be energized. This kind of analysis can be performed by many different types of processing apparatus well known in the art, and thus no detailed circuitry is described herein.

The leads 52 are connected to the input of a circuit functionally described as a group address identifier 54. This apparatus, which may be based on the disclosure of the above-identified Connolly et al. patent, operates to produce an electrical address signal which identifies the location of a group of addresses each, in turn, identifying the location of stored seat inventory data respecting a specific flight meeting the customer's requirements as set forth in the query message in register 48. The group address is directed along line 56 to a group reading control circuit 58 which operates in the usual way to gate the corresponding transducer heads 60 associated with the magnetic drum 26.

The heads 60 operate with an address storage area 62 of the drum 26, and are arranged to read out a group of individual flight addresses corresponding to the group address developed by the identifier circuit 54. These individual flight addresses are stored in suitable registers (not shown) in the group reading control circuit 58, and are directed along a line 64 to a flight data read/write control unit 66. This latter unit activates suitable gates for heads 68 to effect the readout from drum area 70 of the seat inventory data for the individual flights making up the selected group. Corresponding signals are stored in suitable registers 72 connected to control unit 66.

The seat inventory data read out must, of course, be only for the particular day identified by the customer. Thus suitable conventional circuitry forming part of analyzer 50, and responsive to the date signals of the query message in register 48, also is provided to send a signal through lead 74 to cause the gates of control unit 66 to be activated at the proper time to read out only the data for the desired flight day.

The seat inventory data stored in registers 72 then is examined in the usual way to determine whether the customer's needs can be met by the several flights of the selected group. Lead 76 is shown connected between the analyzer 50 and the registers 72 to transmit a signal indicating the number of seats required. After the necessary numerical processing has been carried out, signals are directed along a lead 78 to a reply generator 80 indicating which of the several flights (if any) has sufficient space to satisfy the customer's requirements.

The reply generator 80 also receives from a lead 82 signals identifying all of the flights to be checked in response to the customer's query. Conventional means, e.g., including a local storage of information concerning all flights and referred to as a format storage unit 84, is activated by these flight identifying signals to produce, in conjunction with the numerical answer signals received over lead 78, a reply message consisting of alphanumeric characters describing the selected flights and the information as to whether each flight has sufficient unbooked space to meet the demand. This reply message includes a standardized set of signals establishing a columnar format as will be described hereinbelow.

The complete reply message is directed from the generator 80 along a line 86, through the transmission circuits 22, to the recirculating memory and controls unit 18. Here the reply signals are temporarily stored, e.g., in a conventional buffer 88, and thereafter loaded into the delay line 28 by an insertion gate 90. This gate is controlled by appropriate timing signals 92 arranged to assure that the reply message is placed in a storage portion assigned to the querying agent station. The stored reply message thereafter is directed through line 40 and the multiplexed output controls in the usual way to produce on the associated CRT a display such as illustrated in FIGURE 7.

As indicated by the layout of the display in FIGURE 7, the insertion gate 90 is arranged to place the first set of format characters 94 in a segment of the delay line 28 immediately following the stored query characters, so that the format message is positoned in a line of the CRT display immediately beneath the query message. Similarly, the several sets of reservation data signals respecting the queried flights are directed to successive segments of the delay line, in order that the corresponding flight information be displayed in succeeding lines beneath the first set of format characters, and aligned therewith.

At the start of the format message is "HLE–35," indicating the required check-in time in minutes for the various flights. The format message also establishes certain column headings for selected information presented in the flight data. These column headings include T and F signifying information on availability of reservations for tourist and first-class flights. The format further includes column headings identifying the departure airport and destination, beneath which appear the times of departure and arrival for the flights of the selected group.

Each set of flight data includes the airline and flight number (BE 0339); the flight status conditions (A—seats available; C—space not available; etc.); times of departure and arrival; an arrow indicator for "through" flights; type of aircraft (VA, CA, etc.); an indicator (f) for flights leaving from airport other than the column heading, and an identification (LBG) of such other airport.

This information then is presented to the customer for a decision as to which flight is most desirable. After the customer makes a selection, the agent enters a sell order in the top line, next to the original query message as shown in FIGURE 8. This order is initiated by depressing the SELL key, which produces an S on the CRT, followed by the number of the desired flight, the class of accommodations, and the number of seats.

When this sell order has been checked for accuracy, and corrected if necessary, the agent again presses the TRANS key which causes the order to be sent to the message register 48 of the data processor 24. There the order is examined by the analyzer 50, the output leads 94 of which are suitably activated to identify the specific flight and accommodations selected. This identification signal is fed to the usual sell control unit illustrated by a block 96, and which develops an address signal locating the inventory data respecting the selected accommodations. This signal is directed along a line 98 to the read-write control unit 66, to which also is directed, e.g. along line 74, signals indicating the number of seats to be sold and the day of the flight. The read/write control unit 66 assimilates this information and is operative in known manner to revise the stored inventory data respecting the desired flight so as to reduce the number of available seats by an amount equal to the number sold.

When this revision has been effected, control unit 66 sends a signal over line 82 to the reply generator 80 directing this generator to develop a confirmation message. The reply generator also receives over line 98 a signal identifying the flight sold. Upon receive of these signals, the reply generator develops in conjunction with the local storage unit 84 a reply message such as indicated on FIGURE 9. This reply message includes control signals which are stored in the delay line 28 and are sensed by a Clear Control 102 operable to erase all of the delay line display storage segments for the querying agent station, and to insert in the segment for the top line of the associated CRT the confirmation message such as shown in FIGURE 9.

This confirmation message not only repeats the flight number, to be sure there was no error, but also repeats the departure and destination points with scheduled times for each. In addition, the confirmation message may add other information items about the flight, such as the fact that breakfast is served (indicated by B following the type of aircraft). The number 35 represents the check-in time in minutes, while the SS is processor code for "sold," followed by the number of seats.

If the customer wants to reserve further space, such as a return flight, the procedure will be the same as detailed above. Before this procedure is carried out, the confirmation of the first sale is cleared from the display. However, when the second flight is confirmed, it is displayed together with the first flight as indicated in FIGURE 10.

When the sale transactions have been completed, the agent enters the passenger record into the CRT display, as shown in FIGURE 11, and then presses the TRANS key to send this information to the data processor for storage. In this record, N is the field identifier for name and number of passengers so named, PH is home telephone, PB is business telephone, R is the field identification for "remarks," SPM represents additional information (in this case "special meal"), T is the field identifier for Ticket, 01800/170CT is the ticket status and time limit, B is the field identifier for persons who booked the flight (e.g. Cook agent 328), and the asterisk denotes the end of record.

When the passenger record is entered in the processor 24, the airline agent's number, the date, and the time of transmission are automatically added to the B field. Thereafter, the processor sends back a confirmation, which may simply be in the form of an OK added after the asterisk.

It will be evident that with the present system, a SELL call can be made by the airline agent without first making an Availability call, provided of course that the customer knows the flight number of the leg on which he wants a seat. Also, any stored information can be retrieved by depressing the RETR IT key, followed by an identification of the airline code flight number, date and name. The material stored in the processor also can of course be modified as desired, by procedures not relevant to this disclosure.

One of the important advantages of the disclosed embodiment is that airline schedule changes or modifications in flight groupings can be accommodated with ease, merely by changing the stored data at the central processor 24. No alterations need be made to coded plates or the like at the numerous agent stations to reflect such alterations. Thus costs are significantly reduced, and the reservation agents can carry out their procedures without disturbance when such operating changes are made because the changes are taken care of by the central processor.

We claim:

1. The method of determining and presenting the availability of accommodations comprising the steps of: developing query signals uniquely corresponding to a class of accommodations desired by a customer; storing said query signals in a recirculating memory; presenting on the face of a cathode ray tube a line of alphanumeric characters based on said query signals and representing information indicating the nature of the query; directing said stored query signals to a high speed data processor containing in addressable positions thereof stored data representing the reservation status of a plurality of items about which a reservation query may be made; utilizing at least a portion of said query signals to generate addresses of positions of stored data relating to the desired class of accommodations; developing from said stored data a series of reply signals indicating the reservation status of a corresponding group of said items selected in accordance with the particular query signal directed to said data processor; storing said reply signals in said recirculating memory; and presenting on said cathode ray tube device in positions adjacent said query characters a series of lines of alphanumeric characters identifying the reservation status of the selected group of said items.

2. An on-line reservation system comprising a central data processor including data storage means having a plurality of individually addressable sections, each containing a set of coded information signals representing the current status of reservations for a corresponding class of accommodations;

a plurality of remote stations each containing information input means and cathode ray tube (CRT) information display means;

message composing means responsive to successive inputs from the information input means at a given remote station for assembling in a section thereof associated with said given remote station, a query message concerning reservation accommodations;

means for transmitting the assembled query to said central data processor;

means at said data processor for converting the information in at least part of said query into section addresses for the sections containing status information concerning the queried accommodations;

means responsive to said converting means for accessing the information at the addressed sections;

means for utilizing said accessed information to generate a reply message and for transmitting said reply message to be stored in the section of said message composing means associated with said given remote station; and means responsive to the message stored in the associated section of said message composing means for causing said message to be displayed on the CRT at said given remote station.

3. A system of the type described in claim 2 including means, included as part of said information input means, for indicating the particular accommodation, of the group of accommodations displayed on said CRT, for which a reservation is desired;

means responsive to said indicating means for transmitting a sell message to said central data processor; and means responsive to said sell message for updating the information stored in the section of said data storage means corresponding to said particular accommodation.

4. A system of the type described in claim 3 wherein said central data processor includes means responsive to a received sell message for generating a confirmation message, and means for transmitting said confirmation message to be displayed on the CRT information display means at the remote station which originated the sell message.

5. A system of the type described in claim 4 wherein said confirmation message contains additional information concerning the particular accommodation for which a reservation is desired.

6. A system of the type described in claim 2 wherein a query message includes origin and destination codes and wherein said converting means is operative in response to the origin and destination codes in the query message to provide the addresses of sections containing status information on accommodations between said origin and destination.

7. A system of the type described in claim 2 wherein said reply message generating means includes means for generating a series of signals defining a format message, said format message being stored with the reply reservation information in said section of said message composing means and being utilized to provide format information for the message displayed on the CRT at said given remote station.

8. A system of the type described in claim 4 including means responsive to said confirmation message for clearing from the section of said message composing means associated with said given remote station stored signals concerning non-sold items of accommodation, so as to erase the corresponding message displayed on said CRT.

9. A system of the type described in claim 8 wherein the confirmation message is a fresh series of signals representing information about the reserved items of accommodations so that an independent check on the accuracy of the reservations established at the central data processor is provided on said CRT.

10. A system of the type described in claim 4 wherein said confirmation message is stored in said data storage means in a location designated for a passenger record.

11. A system of the type described in claim 10 wherein a passenger may make a plurality of reservations;

and wherein the confirmation message for each of said reservations is stored as part of said passenger record.

12. A system of the type described in claim 11 wherein it is a passenger record rather than the confirmation message which is transmitted to be displayed on the CRT at the remote station after an accepted sell message.

13. A system of the type described in claim 10 wherein additional information concerning the passenger may be applied to said information input means at said remote station, and stored in said data storage means as part of said passenger record.

References Cited

UNITED STATES PATENTS

| 3,166,636 | 1/1965 | Rutland et al. |
| 3,242,470 | 3/1966 | Hagelbarger et al. 340—153 XR |
| 3,307,156 | 2/1967 | Durr. |
| 3,323,119 | 5/1967 | Barcomb et al. 340—324 |
| 3,134,016 | 5/1964 | Connolly et al. |

OTHER REFERENCES

F. J. Gaffney et al.: "Design Techniques for Multiple Interconnected On-Line Data Processors," Proceedings of The Eastern Computer Conference, pp. 172–177; Dec. 9–13, 1957.

DONALD J. YUSKO, Primary Examiner

U.S. Cl. X.R.

340—324